Dec. 18, 1928.  1,695,546
J. G. GOODHUE
THERMOSTATIC CONTROL OF ELECTRIC CIRCUITS
AND APPARATUS AND OTHER DEVICES
Filed Jan. 15, 1923
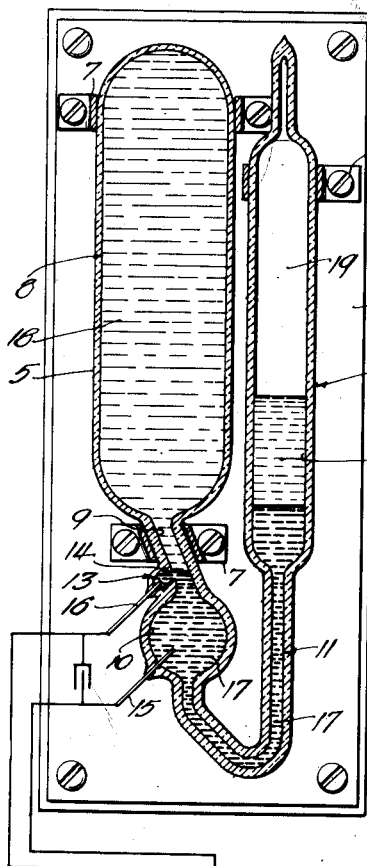
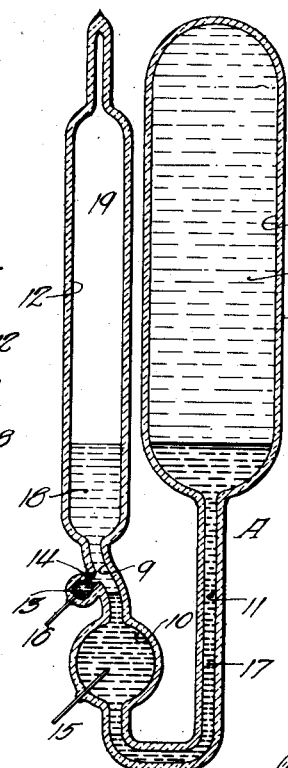
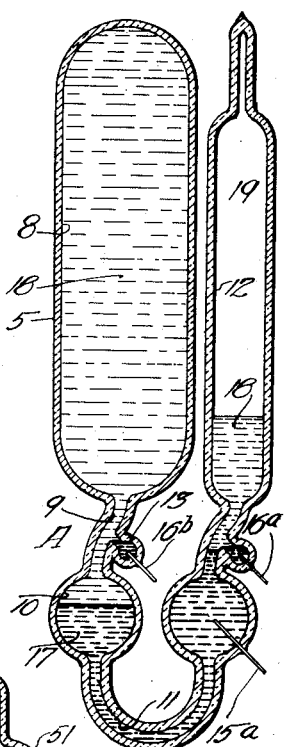
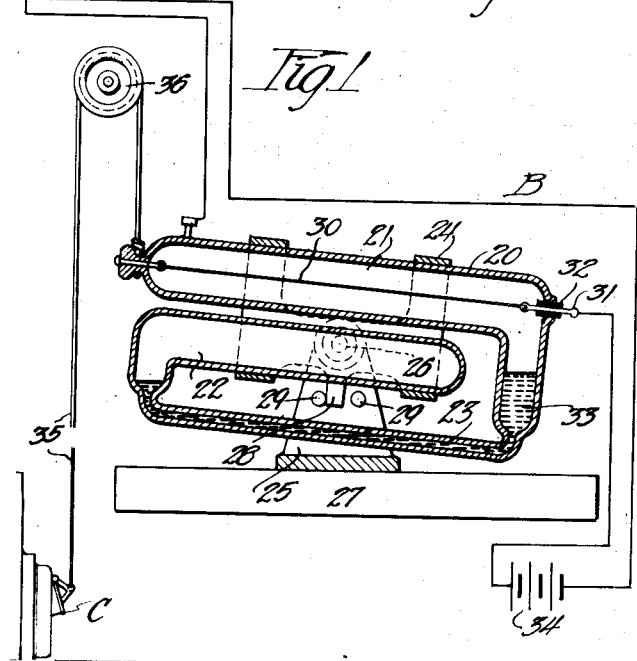
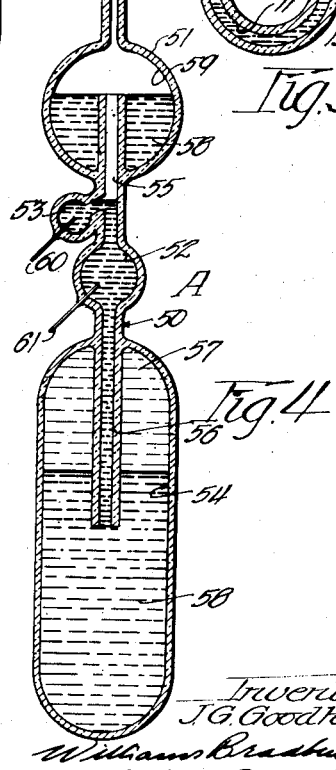
Inventor
J. G. Goodhue Patented Dec. 18, 1928.

1,695,546

UNITED STATES PATENT OFFICE.

JULIAN G. GOODHUE, OF EVANSTON, ILLINOIS, ASSIGNOR TO TRUSTEES OF THE ELECTRIC THERMOSTATIC CONTROL COMPANY, OF CHICAGO, ILLINOIS, A TRUST ESTATE.

THERMOSTATIC CONTROL OF ELECTRIC CIRCUITS AND APPARATUS AND OTHER DEVICES.

Application filed January 15, 1923. Serial No. 612,574.

My invention is concerned with the thermostatic control of electric circuits and apparatus and other devices, and among its objects contemplates:

First: The provision of improved, and whenever necessary, extremely sensitive means for opening and closing an electric circuit by utilizing the expansion and contraction of a plurality of confined fluids to cause two quantities of mercury, or its equivalent, to join and constitute an electricity conducting path when the circuit is to be closed and to cause said mercury to separate or divide and interrupt said path when the circuit is to be opened.

Second: The provision, in combination with a thermostatic circuit controlling device of the character above mentioned, of improved means controlled thereby for utilizing the expansion and contraction of a plurality of confined fluids to shift a column or quantity of mercury, or its equivalent, for the accomplishment of useful work, such, for instance, as the opening and closing of a furnace draft door.

The plan or principle of operation which is characteristic of the aforesaid thermostatic circuit controlling means may be utilized either to open or close a circuit in response to a predetermined increase or decrease of temperature, or may be utilized to open one circuit and close another in response to increased temperature and close the first and open the second in response to decreased temperature.

One of the thermostatic circuit controlled devices herein described in detail is further characterized by the fact that notwithstanding that it contains a plurality of liquids and a gas, the device cannot be so manipulated as to cause any change in the positions of these fluids which will render the device incapable of performing its intended function.

The foregoing and further objects, features and advantages of my present invention will appear from the following detailed description, wherein reference is made to the accompanying drawings, in which Figure 1 is a more or less diagrammatic representation of devices and circuits constructed and operating in accordance with my invention and which effect electro-thermostatic control over a furnace draft door; the thermostatic circuit controlling device forming part of this system being one which opens the circuit controlled thereby in response to increased temperature and closes the circuit in response to decreased temperature;

Figure 2 diagrammatically illustrates a thermostatic circuit controlling device generally similar to the thermostatic circuit controlling device of Figure 1, but differing therefrom in the respect that it closes the circuit in response to increased temperature and opens the circuit in response to decreased temperature;

Figure 3 illustrates a thermostatic circuit controlling device for exercising control over two circuits, opening one and closing the other in response to increased temperature, and closing the first and opening the second in response to decreased temperature.

Figure 4 illustrates a modified form of thermostatic circuit controlling device which is particularly advantageous because it cannot be so manipulated as to cause a deranging displacement of any of its several contained fluids.

Similar characters of reference refer to similar parts throughout the several views.

Referring first to Figure 1, reference letter A indicates a thermostatic circuit controller constructed and operating in accordance with my invention, B indicates a novel translating device controlled by the element A and C indicates a draft door operated by element B.

Referring now to the device A of Figure 1, reference numeral 5 indicates an irregularly conformed container that is preferably, but not necessarily, formed of glass, is generally U-shaped and has both of its legs closed against communication with the outside air. Container 5 is conveniently mounted on a panel 6 by suitable devices illustrated at 7.

The upper end of the left-hand leg of container 5 is conformed to provide a chamber 8 communicating through a passage 9 with a substantially spherical chamber 10, which in turn communicates through passage 11 with the chamber 12 in the right-hand leg of the container. Chamber 19 is of substantial size, but is here illustrated as of considerably less capacity than the chamber 8. The capacities of chambers 8 and 12 will be varied in accordance with the character of the fluids employed, the temperature range within which the device is intended to operate, and certain other variables which will suggest themselves to persons familiar with the art to which my invention relates.

Particular attention is directed to the small substantially spherical chamber 13 which communicates with the passage 9 through a passage 14, the chamber 13 and passage 14 in effect constituting a fluid passage or receptacle which is blind at one end and which communicates approximately at right angles with the passage 9.

Extending through the walls of spherical chambers 10 and 13 are the electrodes 15 and 16. When the container 5 is formed of glass, as herein illustrated, the electrodes are preferably formed of platinum or other material which has substantially the same co-efficient of expansion as the glass of which the container is formed.

Reference numeral 17 indicates a quantity of comparatively heavy electricity conducting fluid, preferably mercury, which, under the conditions illustrated in Figure 1, occupies the lower part of chamber 12, the passage 11, chamber 10, the lower portion of passage 9, the passage 14 and the chamber 13. Under the conditions illustrated in Figure 1, the mercury, or its equivalent, affords electrical connection between the electrodes 15 and 16.

Reference numeral 18 indicates a liquid which is relatively lighter than the mercury, or its equivalent, and which is not a conductor of electricity. Under the conditions shown in Figure 1, one quantity of the liquid 18 (which may be benzine, alcohol, turpentine, water, or the like) fills the chamber 8 and occupies the upper portion of passage 9. Another quantity of the same or a similar liquid occupies a portion of chamber 12 and lies above the heavier liquid 17. The space in chamber 12 above the liquid 18 is filled with a gas 19, such as air, hydrogen, or the like.

Before proceeding to describe the operation of the thermostatic circuit controlling device of Figure 1, I shall assume that the air or other medium surrounding the container 5 is of such temperature that the several fluids occupying the container have assumed the several positions shown in the drawing. Under such a condition the electricity conducting liquid 17 affords electrical connection between the electrodes 15 and 16. I shall now assume that the temperature of the air or other medium surrounding the container 5 is raised. The resultant increase in the temperature of the liquid occupying chamber 8 causes such liquid to expand with the result that such liquid forces itself further down passage 9, and, under some conditions, into spherical chamber 10. The heavy electricity conducting liquid occupying the lower portion of passage 9 is thus wholly or partially displaced from the passage 9, with the result that the electricity conducting liquid occupying chamber 13 and passage 14 is mechanically and electrically separated from the balance of such electricity conducting fluid.

The liquid 18, being preferably a good non-conductor, not only serves mechanically to separate the quantities of electricity conducting fluid in contact with electrodes 15 and 16, but also, by actually occupying the space between said separated quantities of electricity conducting fluid, guards against the leakage of current between the electrodes 15 and 16, or, more accurately, between the quantities of electricity conducting fluid in contact with such electrodes.

When the electricity conducting liquid 17 is displaced by the expansion of the liquid 18 in chamber 8, as just explained, the said liquid 17 rises in the right-hand leg of the container and compresses the confined gas 19. Thus it will be seen that in the embodiment of my invention illustrated in Figure 1, the electrical disconnection of the electrodes is effected by the expansion of the non-conducting liquid which displaces the electricity conducting liquid to compress the confined gas. At this point I may state that it is not absolutely necessary to provide a quantity of the liquid 18 in the right-hand leg of container 5 (Figure 1). It is desirable, however, to have chamber 12 contain a quantity of the liquid 18 and to determine the temperatures at which the conducting liquid 17 will make and break electrical connection between electrodes 15 and 16 by shifting the liquid 18 from chamber 8 to chamber 12 and vice versa until the proper adjustment is obtained. This may be done by physical manipulation of container 5 after the same is closed.

When the temperature of the air or other medium surrounding the container 5 decreases, the liquid 18 contracts and the electricity conducting liquid 17, which is in contact with the electrode 15, moves under the pressure of the gas 19 to join with the electricity conducting liquid in contact with electrode 16.

I have found that a thermostatic circuit controlling device of the kind shown in Figure 1 may be made very sensitive. In fact, it is feasible, by proper selection and proportioning of the fluids employed, to cause the device to operate within a temperature range as small as one-twentieth of one degree Fahrenheit. The separation of the quantities of electricity conducting fluid in contact with the electrodes and the joining of such quantities of such fluid is accomplished very quickly and without any arcing or flashing when handling low voltages. In some cases, it is desirable to bridge a condenser across the electrodes, as illustrated. When the liquid 18 is one which will break down in the presence of an electric arc, it is necessary to employ a condenser unless the voltage drop between electrodes 15 and 16 is extremely small.

I shall now describe the device B, which is controlled by the thermostatic circuit controlling device just described. The device B comprises a container 20, preferably formed of a metal which is not subject to attack by the fluids contained thereby. The container 20 is fluid-tight and is conformed to provide two substantially L-shaped chambers 21 and 22, which are disposed with their longer portions parallel and in proximity to each other and with their shorter portions parallel, but remote from each other. The shorter portions of the said L-shaped chambers 21 and 22 are connected by a passage 23. The container 20 is rigidly fixed in a saddle 24, the saddle being provided with suitable trunnions for mounting the container 20 in a bracket or standard 25 for movement around a horizontal axis indicated at 26. Bracket or standard 25 is preferably mounted upon a suitable base 27. Movement of the container 20 around the horizontal axis 26 is limited by a finger 28, carried by saddle 24, which cooperates with pins 29—29 carried by the bracket or standard 25.

Located within the chamber 21 is an electrical heating element 30 which may consist of a strand of resistance wire having one end grounded to the metal of container 20 and its other end connected with a terminal 31 which is insulated from the container 20 by a suitable sleeve 32 of dielectric material.

At 33 I have indicated a quantity of mercury which fills the passage 23, the said mercury, as shown in the drawing, extending a substantial distance up into the shorter leg of chamber 21 and not extending any substantial distance up into the shorter leg of chamber 22. As shown in the drawing, the preponderance of the weight of the mercury is located to the right of axis 26 with the result that finger 28 lies in engagement with the left-hand pin 29. The spaces in the container 20 which are not occupied by mercury are occupied by a gas, such as air, hydrogen, or the like. The gas in chamber 21 is preferably, but not necessarily, inert gas, such as hydrogen. The nature of the gas in chamber 22 is not material so long as it is one which will not react chemically with the material of container 20 or the liquid contained thereby.

As illustrated in Figure 1, the electrical heating element 30 is connected in a closed circuit including a battery 34 and the electrodes 15 and 16 of the thermostatic circuit controller A. I will ask the reader to assume that electrical connection between electrodes 15 and 16 has just been completed and that the device B has not yet operated in response to the closing of the circuit including its heating element 30.

Heating of the element 30 results in expansion of the gas confined within chamber 21. The expansion of this gas causes the mercury 33 to be shifted from right to left through passage 23. Continued expansion of the gas within the chamber 21 transfers the preponderance of the weight of the mercury from the right to the left side of the axis 26, with the result that the container 20 moves around the axis 26 and takes a position wherein the finger 28 lies against the right hand pin 29. When the circuit including the heating element 30 is subsequently opened, the pressures within chambers 21 and 22 equalize to reestablish the conditions illustrated in the drawing.

From the foregoing, it will be understood that the rocking container 20 assumes a position wherein its right-hand end is uppermost when its heating element 30 is excited, and assumes a position wherein its right-hand end is lowermost when the circuit of the heating element is open. This operation of the rocking container 20 may be utilized to perform useful work of any kind. I have elected, however, to illustrate the device B as a means for opening and closing the draft door of a furnace.

The draft door, indicated at C is connected through a cord or cable 35 with the left-hand end of the container 20, the cable preferably passing over a pulley indicated at 36. Assuming that the thermostatic circuit controlling device indicated at A is located in a room heated by the furnace provided with draft door C, the device B will function to open the draft door whenever the electrodes 15 and 16 of the device A are electrically connected, the said device B functioning to permit the draft door to close whenever electrical connection between electrodes 15 and 16 is interrupted due to an expansion of the liquid 18 in chamber 8 pursuant to an increase in the room temperature. It will be understood, of course, that the draft door C may be counter-balanced so that no considerable displacement of the mercury in device B will be required to operate and control the draft door as herein explained.

The thermostatic circuit controller of Figure 2 differs from the device A of Figure 1 only in that the expansion of the liquid contained in chamber 8 tends to shift the electricity conducting liquid 17 to effect electrical connection between the electrodes, pursuant to a predetermined increase of the temperature of the air or other medium surrounding container 5. A predetermined decrease of temperature of such medium results in movement of the conducting fluid 17 under the pressure of gas 19 to interrupt the conducting path between the electrodes. With this explanation I believe that the construction and mode of operation of the device shown in Figure 2 will be readily understood by persons skilled in the art to which my invention relates.

The thermostatic circuit controller illustrated in Figure 3 is designed to make or break one circuit in response to a predetermined change in the temperature of the medium surrounding the container 5 and substantially simultaneously to break or make another circuit. The device of Figure 3 comprises a pair of electrodes 16ª and 16ᵇ, each of which projects into a substantially spherical chamber containing a quantity of mercury adapted to become a unit with or separated from a relatively larger quantity of mercury which shifts under the influence of the controlling fluids. Heating and the resultant expansion of the liquid 18 in chamber 8 displaces mercury electrically to connect electrode 16ª with the third electrode 15ª, whereas, cooling and the resultant contraction of liquid 18 in chamber 8 permits the compressed gas in chamber 12 to displace mercury to interrupt electrical connection between electrode 16ª and electrode 15ª and to establish electrical connection between electrodes 16ᵇ and 15ª. With this explanation it is believed that the construction, mode of operation, uses and advantages of the circuit controller shown in Figure 3 will also be apparent to persons familiar with the art to which my invention relates.

In Figure 4 I have illustrated a modified thermostatic circuit controlling device which, while differing considerably in construction from the thermostatic circuit controllers shown in the preceding figures, functions in accordance with the same general plan or principle of operation. The device of Figure 4 comprises a container 50, which is preferably, but not necessarily, formed of glass. The container 50 is fluid tight and provides the substantially spherical chamber 51, a relatively smaller spherical chamber 52, a third spherical chamber 53, and an elongated lower chamber 54. Spherical chamber 52 communicates with spherical chamber 51 through a passage 55 which terminates in chamber 51 a slight distance above the center of the latter. Spherical chamber 52 also communicates with chamber 54 through a passage 56 which terminates within chamber 54 at substantially the center thereof.

Reference numeral 57 indicates a liquid, such as alcohol, benzine, turpentine or water, which occupies the upper portion of chamber 54, and, as shown in Figure 4, is located entirely above the lower end of the passage 56. Reference numeral 58 represents a quantity of mercury or other relatively heavy electricity conducting fluid which, together with the fluid 57, entirely fills chamber 54, the electricity conducting fluid 58 also filling passage 56 and the spherical chambers 52 and 53. Spherical chamber 51 also contains mercury to the level of the top of the passage 55, the space above the mercury in the chamber 51 being filled with a suitable gas 59, such as air, hydrogen or the like. Projecting into spherical chamber 53 is a suitable electrode 60, and projecting into spherical chamber 52 is a similar electrode 61. Under the conditions shown in Figure 4, it should be assumed that the fluid 57 is comparatively warm and has expanded to establish a conducting path through mercury between the electrodes 60 and 61, the gas within spherical chamber 51 having been compressed as the result of the displacement of mercury in chamber 58. Assuming that the temperature of the air or other medium surrounding chamber 54 decreases, the liquids 57 and 58 in chamber 54 will contract and the gas under pressure in chamber 51, assisted by gravity, will act to shift the mercury in passage 55 away from, and out of electrical contact with, the mercury in spherical chamber 53, thus breaking the electrical connection between the electrodes 60 and 61.

The device shown in Figure 4 possesses many, if not all, of the advantages of the thermostatic circuit controller construction of Figure 1, and affords at least one advantage not afforded by the construction shown in Figure 1. The advantage to which reference is made is the fact that it is not possible to so manipulate the container 50 that the several fluids contained therein will not assume their proper operative positions when the container is disposed vertically with the chamber 51 uppermost.

The spherical chambers 10 of the thermostatic circuit controllers of Figures 1, 2 and 3, and the chamber 52 of the device of Figure 4, are designed to take care of excessive changes in temperature after an electric circuit has been made or broken.

Having thus illustrated and described several embodiments of my invention, I do not wish to limit myself to the particular constructions herein shown and described, but, to the contrary, wish to avail myself of all equivalent constructions falling within the terms or spirit of the appended claims.

What I claim is new and desire to secure by Letters Patent of the United States is:

1. In a device of the class described, a container having two vertical chambers having their lower ends connected by a U-shaped passageway, a pair of electrical contacts permanently surrounded by mercury in recesses communicating with said passageway adjacent each of said chambers, a third contact in the lower portion of said passageway, mercury in said passageway, an insulating liquid in one of said chambers, and a gas and insulating liquid in the other, said liquid in the first named chamber being adapted to expand upon increase in temperature so as to break the mechanical and electrical connection of the mercury between one of said pairs of contacts and said third contact, and said chambers and said U-shaped passageway being adapted to permit portions of the insulating liquid to be transferred from one chamber to the other upon physical manipulation of the container.

2. In a thermostatic circuit breaker, the combination of a sealed glass container comprising a plurality of adjacent chambers connected by a curved conduit, with an electrical conducting fluid in said container, an electrical insulating and thermally responsive fluid in one of said chambers, gas in another of said chambers and a plurality of electrical contacts in position to engage said conducting fluid, said conduit being of sufficient size to permit quantities of the insulating fluid to be passed from one chamber to the other by tilting said container.

In witness whereof, I hereunto subscribe my name this 13th day of January, 1923.

JULIAN G. GOODHUE.